(12) United States Patent
Vijay Kumar

(10) Patent No.: US 10,579,758 B2
(45) Date of Patent: Mar. 3, 2020

(54) METHOD AND SYSTEM FOR IMPLEMENTATION OF USER LOGIC IN A FIELD PROGRAMMABLE GATE ARRAY DEVICE

(71) Applicant: WIPRO LIMITED, Bangalore (IN)

(72) Inventor: Kodavalla Vijay Kumar, Bangalore (IN)

(73) Assignee: Wipro Limited, Bangalore (IN)

( * ) Notice: Subject to any disclaimer, the term of this patent is extended or adjusted under 35 U.S.C. 154(b) by 107 days.

(21) Appl. No.: 15/940,574

(22) Filed: Mar. 29, 2018

(65) Prior Publication Data

US 2019/0303519 A1    Oct. 3, 2019

(30) Foreign Application Priority Data

Mar. 29, 2018 (IN) .............................. 201841011976

(51) Int. Cl.
*G06F 17/50* (2006.01)
(52) U.S. Cl.
CPC ...... *G06F 17/5027* (2013.01); *G06F 17/5031* (2013.01)
(58) Field of Classification Search
CPC .................. G06F 17/5027; G06F 17/5031
USPC ........................................ 716/101, 104, 116
See application file for complete search history.

(56) References Cited

U.S. PATENT DOCUMENTS

| | | | |
|---|---|---|---|
| 5,572,710 A * | 11/1996 | Asano et al. ...... | G06F 17/5022 703/15 |
| 6,408,422 B1 * | 6/2002 | Hwang et al. ...... | G06F 17/5072 716/116 |
| 6,894,530 B1 * | 5/2005 | Davidson et al. .......................... | H03K 19/17732 326/38 |
| 7,185,299 B1 * | 2/2007 | Jayaraman .......... | G06F 17/5054 716/113 |
| 2019/0109720 A1 * | 4/2019 | Olarig .................... | H04L 12/04 |

OTHER PUBLICATIONS

"Vivado Design Suite User Guide: Implementation", *XILINX*, (2016), 174 pages.
"Intel® Quartus® Prime Pro Edition Handbook vol. 1: Design and Compilation", *Intel*, (2017), 1787 pages. (filed in two separate parts).

\* cited by examiner

*Primary Examiner* — Sun J Lin
(74) *Attorney, Agent, or Firm* — Finnegan, Henderson, Farabow, Garrett & Dunner, LLP

(57) ABSTRACT

Embodiments of present disclosure relates to a method and a system for implementation of user logic in a FPGA device. For the implementation, user logic is mapped onto cells of the FPGA device in implementation platform associated with FPGA device. The mapping is based on user logic constraints to be met and received for FPGA device. Further, mapped cells of FPGA device are placed in implementation platform based on local mapping optimization parameters. The placing also comprises of performing placement optimization on placed cells of FPGA device. Upon placement, placed cells of FPGA device are routed in implementation platform based on at least local mapping optimization parameters and local placement optimization parameters. The routing also comprises of performing routing optimization on routed cells of FPGA device.

20 Claims, 13 Drawing Sheets

METHOD AND SYSTEM FOR IMPLEMENTATION OF USER LOGIC IN A FIELD PROGRAMMABLE GATE ARRAY DEVICE

TECHNICAL FIELD

The present subject matter is related in general to integrated circuits, more particularly, but not exclusively to a system and method for implementation of user logic in a Field Programmable Gate Array (FPGA) device.

BACKGROUND

Implementation of an integrated circuit include one or more stages of processing on a logic which is to be implemented. For a FPGA device, the logic may initially be synthesised based on user inputs including one or more design constraints. Further, using the synthesized logic, implementation may be performed. One or more conventional methods are available to perform the implementation using an implementation tool or an implementation platform In conventional methods for the implementation, include placing process and routing process on the logic. Along with the placing process and the routing process, post placement optimization and post routing optimization may be performed in the conventional methods. Each of post placement optimization and post routing optimization may include one or more processes such as, fan-out optimization process, re-routing process, register replication process, retiming process and so on. By the fan-out optimization process, load on driving nets of the logic may be reduced. By the re-routing process, re-routing with short length routes may be performed. By the register replication process, driving flops may be replicated to reduce load on each of the driving flops. By the re-timing process (adjusting of combinatorial logic between adjacent flip-flop stages may be performed. By said post placement optimization and said post routing optimization, only minor corrections associated with the placing and the routing may be performed. Hence, the post placement optimization and the post routing optimization may be effective only if there are few timing violations and the timing violations are negligible. Also, the post placement optimization and the post routing optimization may not be configured to perform gross corrections which include major changes in the placing based on the mapping and major changes in the routing based on the placing. In the present time, with enhancement in technology associated with integrated circuits and considering that the FPGA devices are developed with bigger size and higher capacity, the gross corrections may be essential to obtain an optimal timing performance of user logic in the FPGA device.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for implementation of user logic in a FPGA device. Initially, for the implementation, a user logic is mapped onto one or more cells of the FPGA device in an implementation platform associated with the FPGA device. The mapping is based on one or more user logic constraints to be met and received for the FPGA device. Further, the one or more mapped cells of the FPGA device are placed in the implementation platform based on one or more local mapping optimization parameters. The placing also comprises performing a placement optimization on the one or more placed cells of the FPGA device. Upon the placement, the one or more placed cells of the FPGA device are routed in the implementation platform based on at least the one or more local mapping optimization parameters and one or more local placement optimization parameters. The routing also comprises performing a routing optimization on the one or more routed cells of the FPGA device.

In an embodiment, the present disclosure relates to an implementation system for implementation of user logic in a FPGA device. The implementation system comprises a processor and a memory communicatively coupled to the processor. The memory stores processor-executable instructions, which on execution cause the processor to implement the user logic in the FPGA device. Initially, for the implementation, a user logic is mapped onto one or more cells of the FPGA device in an implementation platform associated with the FPGA device. The mapping is based on one or more user logic constraints to be met and received for the FPGA device. Further, the one or more mapped cells of the FPGA device are placed in the implementation platform based on one or more local mapping optimization parameters. The placing also comprises performing a placement optimization on the one or more placed cells of the FPGA device. Upon the placement, the one or more placed cells of the FPGA device are routed in the implementation platform based on at least the one or more local mapping optimization parameters and one or more local placement optimization parameters. The routing also comprises performing a routing optimization on the one or more routed cells of the FPGA device.

In an embodiment, the present disclosure relates a non-transitory computer readable medium including instructions stored thereon for implementation of user logic in a Field Programmable Gate Array (FPGA) device, which when executed by at least one processor cause a device to perform operations for implementation of user logic in a FPGA device. The operations include, initially, mapping a user logic onto one or more cells of the FPGA device in an implementation platform associated with the FPGA device. The mapping is based on one or more user logic constraints to be met and received for the FPGA device. Further, the one or more mapped cells of the FPGA device are placed in the implementation platform based on one or more local mapping optimization parameters. The placing also comprises performing a placement optimization on the one or more placed cells of the FPGA device. Upon the placement, the one or more placed cells of the FPGA device are routed in the implementation platform based on at least the one or more local mapping optimization parameters and one or more local placement optimization parameters. The routing also comprises performing a routing optimization on the one or more routed cells of the FPGA device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
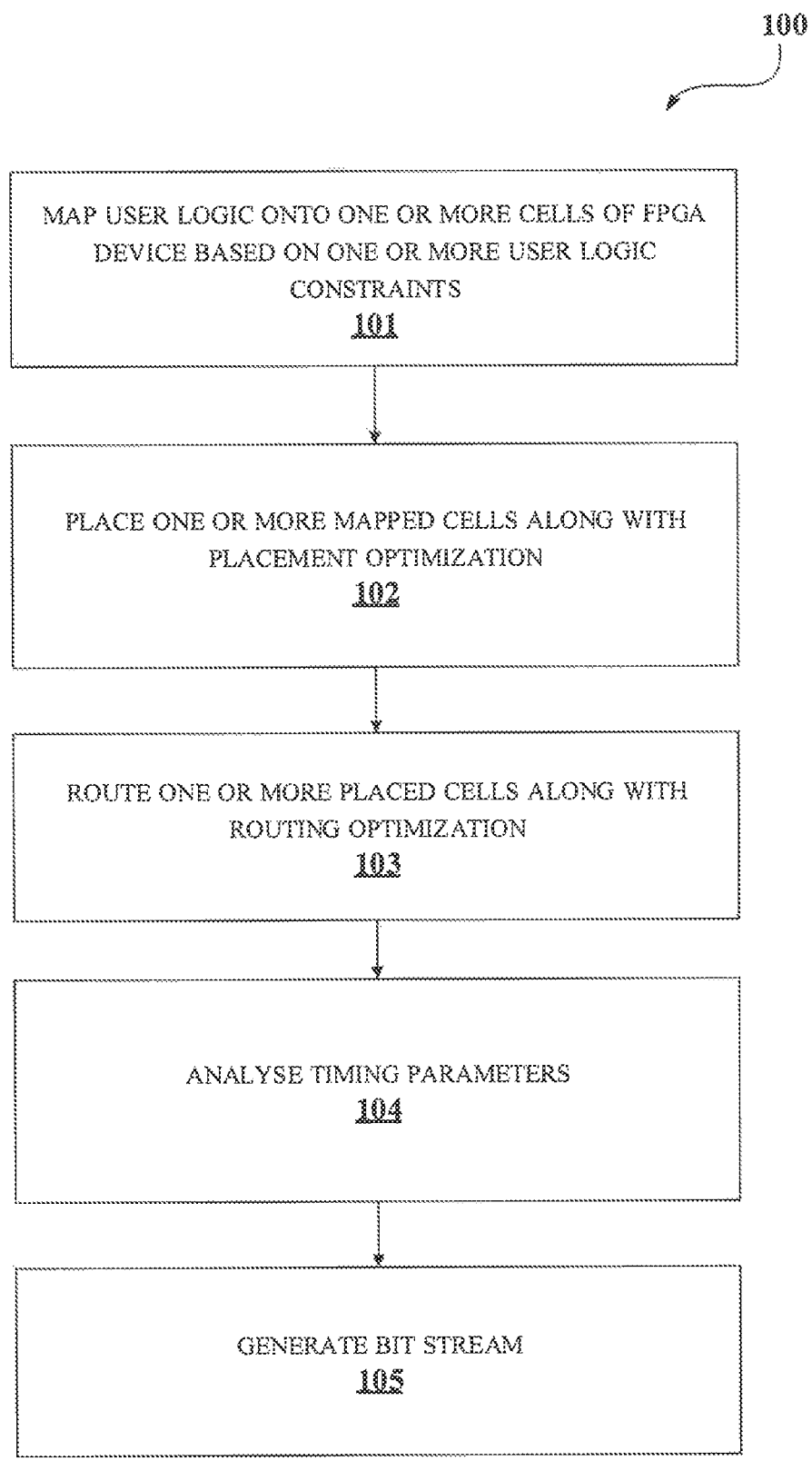
FIG. 1 shows a flowchart illustrating conventional method for implementation of user logic in a FPGA device.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows a flowchart illustrating an implementation of a logic in the FPGA device.

At block 101, the logic may be mapped onto one or more cells of the FPGA device.

At block 102, the one or more mapped cells may be placed. Here, entire user logic may be placed for the implementation and may also be referred as a global placement. After performing the global placement i.e., post placement, a placement optimization may be performed, which include optimizations in the one or more cells by considering a global scale of the one or more cells.

At block 103, the one or more placed cells may be routed. Here, each of the one or more placed cells may be interconnected by performing the routing. Said routing may also be referred as a global routing. After performing the global routing i.e., post routing, a routing optimization may be performed which include optimizations in the one or more cells by considering the global scale of the one or more cells.

At block 104, upon the placing and the routing, timing parameter associated with the one or more cells may be analysed. Static timing analysis may be carried out and timing closure in the logic, which is placed and routed, may be assessed by performing the analysis.

At block 105, upon satisfactory timing closure of the user logic, a bit stream may be generated. The bit stream may be generated based on the placing and the routing.

For the implementation for a user logic in a FPGA device, present disclosure provides an efficient methodology and system. The present disclosure provisions to perform local optimization along with global optimization during placing and routing stage in the implementation. By which, timing performance of the user logic implemented in the FPGA device, may be improved. One or more local mapping optimization parameters are considered during the placing for the local optimization. The one or more local mapping optimization parameters and one or more local placement optimization parameters are considered during the routing for the local optimization. The one or more local mapping optimization parameters may include at least one of a cell-type parameter and a cell-mapping parameter. The one or more local placement optimization parameters may include at least one of a cell movement parameter, a cell packing density parameter and an interconnect utilization density parameter. By the proposed local optimization, minor changes associated with each of the one or more cells may be performed during the placing and the routing.

Figure 2:
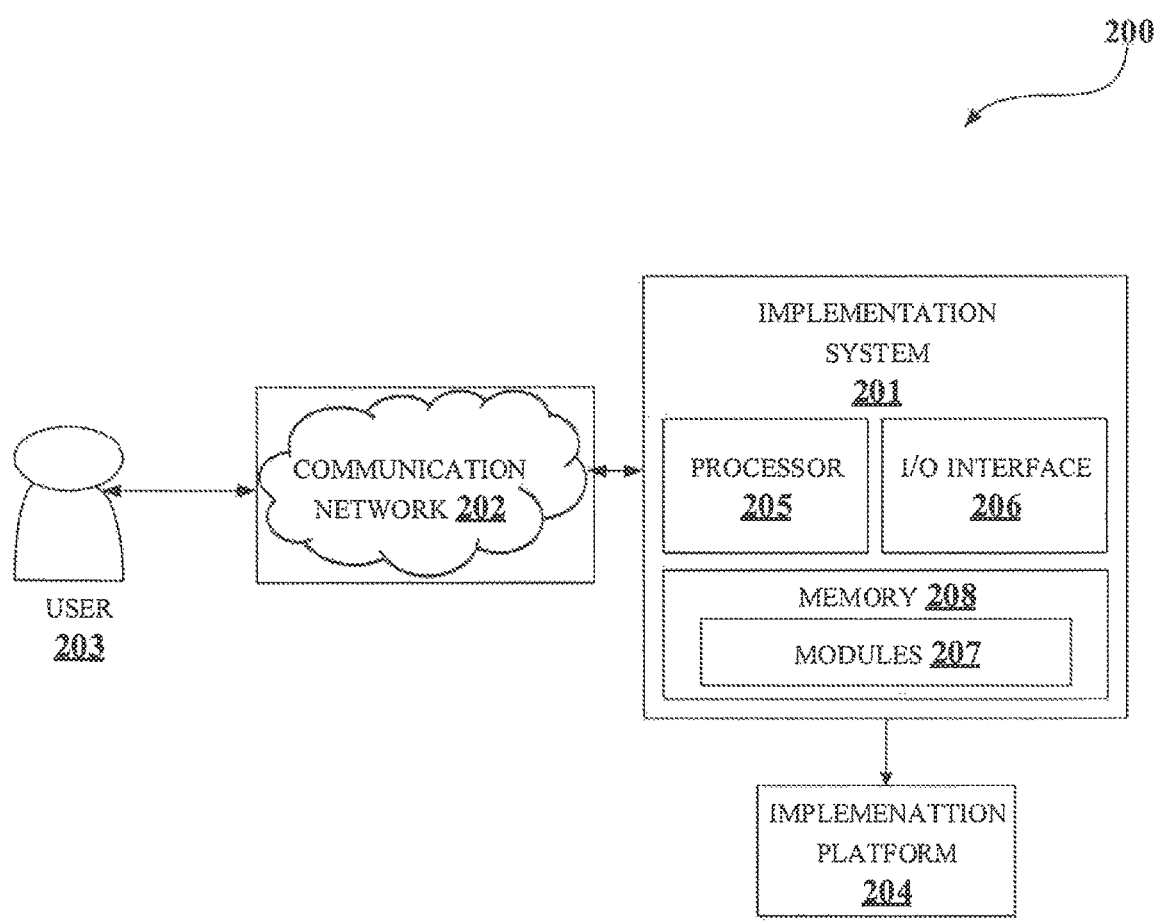
FIG. 2 shows an exemplary environment for implementation of user logic in a FPGA device, in accordance with some embodiments of the present disclosure.

FIG. 2 illustrates an exemplary environment 200 for implementation of a user logic in a FPGA device. The exemplary environment 200 may comprise an implementation system 201, a communication network 202 and an implementation platform 204 communicatively connected with a user 203 for the implementation. The implementation system 201 may be configured to implement the user logic in the FPGA device by performing steps as disclosed in the present disclosure. The implementation system 201 may communicate with the 203 via the communication network 202 as shown in the figure. In an embodiment, the user logic and one or more user logic constraints used for the implementation are retrieved from the user 203 by the implementation system 201 via the communication network 202. The user 203 may be any person associated with the implementation of the user logic. The user logic received from the user 203, by the implementation system 201, may be synthesised by a synthesis module associated with the implementation system 201 (not shown in the Figure). In an embodiment, the user 203 may provide input in form of Hardware Description Language (HDL) which may be synthesised to obtain the user logic. In an embodiment, the user logic maybe description of connectivity in an electronic circuitry which is to be implemented in the FPGA device. In an embodiment, the user logic may include list of one or more electronic components in the electronic circuitry and their connections. Along, with the user logic, the one or more user logic constraints may also be received by the implementation system 201. In an embodiment, the one or more user logic constraints may include, but are not limited to, timing constraints, area constraints, location constraints and so on. The timing constraints may be associated with internal timing interconnections, delays through logic and Look-Up Tables (LUTs) and between Flip-Flops (FFs) or registers. The area constraints may be associated with mapping specific circuitry to a range of resources within the FPGA device. The location constraints may be associated with location of each of one or more cells either in relative or to a cell from another user logic. The location constraint may be associated with location of the one or more cells with respect to specific fixed resource within the FPGA device.

In an embodiment, the implementation proposed in the present disclosure may be performed in the implementation platform 204 associated with the FPGA device. In an embodiment, the implementation platform 204 may be a tool configured to enable the user 203 to implement and verify the implementation of the user logic in the FPGA device. In an embodiment, the implementation tool be associated with a User Interface (UI) for provisioning the implementation. In an embodiment, one or more steps performed by the implementation system 201 may be performed on the implementation platform 204. In an embodiment, the implementation system 201 may communicate with the implementation platform 204 via the communication network 202 (not shown in the figure). In an embodiment, the communication network 202 may include, without limitation, a direct interconnection, Local Area Network (LAN), Wide Area Network (WAN), wireless network (e.g., using Wireless Application Protocol), the Internet, and the like. In an embodiment, the implementation platform 204 may be integral part of the implementation system 201.

Further, the implementation system 201 may include a processor 205, I/O interface 206, one or more modules 207 and a memory 208. In some embodiments, the memory 208 may be communicatively coupled to the processor 205. The memory 208 stores processor executable instructions, which, on execution, may cause the implementation system 201 to implement the use logic, as disclosed in the present disclosure. In an embodiment, the memory 208 may include the one or more modules, which may be configured to perform the steps of the present disclosure. In an embodiment, each of the hardware modules may be a hardware unit which may be outside the memory 208 and coupled with the implementation system 101. The implementation system 201 may be implemented in a variety of computing systems, such as a laptop computer, a desktop computer, a Personal Computer (PC), a notebook, a smartphone, a tablet, e-book readers, a server, a network server, and the like.

For the implementation, initially, the implementation system 201 may receive the user logic from the user 203 and map the user logic onto the one or more cells of the FPGA device. The mapping may be performed on the implementation platform 204. The mapping may be based on the one or more user logic constraints received for the FPGA device. In an embodiment, by the mapping, the implementation system 201 may output a design which may physically represent design of the user logic mapped with components i.e., the one or more cells of the FPGA device.

Upon mapping, the implementation system 201 may place the one or more mapped cells of the FPGA device in the implementation platform 204. In an embodiment, by the placement, the implementation system 201 may be configured to decide on where to place the electronic components, circuitry, or one or more logic elements associated with the user logic, in the implementation platform 204. In an embodiment, for the placement, the implementation system 201 may use the user logic and the one or more user logic constraints along with a technology library to provide a valid placement layout in the implementation platform 204.

In an embodiment, the placing may be based on the one or more local mapping optimization parameters. The one or more local mapping optimization parameters may include, but are not limited to, at least one of a cell-type parameter and a cell-mapping parameter. In an embodiment, the cell-type parameter may be associated with local change in cell type of the one or more cells. For example, for the placing, cell type of memory used in the user logic may be changed from block memories to distributed memories and vice versa. Similarly, the cell type of multipliers used in the user logic may be changed from Digital Signal Processor (DSP) multiplier cells to logic based multiplier. In an embodiment, the cell-mapping parameter may be associated with local change in cell mapping of the one or more cells. For example, mapping of shift registers may be changed in the user logic, for the placing. By performing the placing based on the one or more local mapping optimization parameters, timing performance associated with the user logic may be improved.

In the present disclosure, along with performing the placing based on the one or more local mapping optimization parameters, placement optimization may also be performed by the implementation system 201. The placement optimization may be associated with changes on the placing at a global scale of the one or more cells. In an embodiment, the placement optimization may include, but is not limited to, at least one of a fan-out optimization process, a re-routing process, a register replication process, and a re-timing process, performed during the placing.

Upon the placing, the implementation system 201 may route the one or more placed cells of the FPGA device in the implementation platform 204. In an embodiment, by the routing, design for one or more wires to connect the one or more cells based on the user logic may be decided. By the routing, proper connection between the placed one or more cells may be achieved.

In an embodiment, the routing may be based on the one or more local mapping optimization parameters and the one or more local placement optimization parameters. As described previously, the one or more local mapping optimization parameters may include, but are not limited to, at least one of the cell-type parameter and the cell-mapping parameter. The one or more local placement optimization parameters may include, but are not limited to, at least one of a cell movement parameter, a cell packing density parameter and a interconnect utilization density parameter. In an embodiment, the cell movement parameter may be associated with local movement of placement of one or more cells based on proximity of the one or more cells. For example, based on the proximity, logic driving block may be moved closer to block memories. In an embodiment, the cell packing density parameter may be associated with local packing of the one or more cells based on routability among the one or more cells. For example, based on the routability of logic element in the user logic, the local packing of the logic element may be modified. In an embodiment, the interconnect utilization density parameter may be associated with local interconnection utilization of one or more cells based on routing congestion. For example, based on the routing congestion with respect to a routing switch matrix in the user logic, the local interconnection utilization may be modified.

In the present disclosure, along with performing the routing based on the one or more local mapping optimization parameters and one or more local placement optimization parameters, routing optimization may also be performed by the implementation system 201. The routing optimization may be associated with changes on the routing at the global scale of the one or more cells. In an embodiment, the routing optimization may include, but is not limited to, at least one of a fan-out optimization process, a re-routing process, a register replication process, and a re-timing process, performed during the routing.

In an embodiment, the implementation system 201 may be configured to perform analysis of one or more timing parameters associated with the FPGA device in the implementation platform 204. In an embodiment, a static timing analysis may be implemented for analysing the one or more timing parameters. By the static timing analysis, timing performance associated with the routed user logic may be computed. One or more techniques, known to a person skilled in the art may be implemented for computing the timing performance. Further, implementation system 201 may be configured to determine if timing performance of the routed user logic in the FPGA device has met the one or more user logic constraints.

In an embodiment, the implementation system 201 may be configured to generate a bit stream for the FPGA device in the implementation platform 204 based on the placing, the routing, and the timing performance. In an embodiment, the bit stream may be a file that contains programming information for the FPGA device. The programming information may be including specific bit stream that may aid in the user logic to function as an embedded hardware platform. In an embodiment, the implementation system 201 may generate bit stream based on configuration of hardware platform of the FPGA device. In an embodiment, the implementation system 201 may receive the bit stream directly from a user who is associated with designing the hardware platform. In an embodiment, the bit stream may be generated upon verifying that the timing performance of the routed user logic in the FPGA device has met the one or more user logic constraints.

In an embodiment, the implementation system 201 may receive data for the implementation of the user logic through the I/O interface 206 of the implementation system 201. The received data may include, but is not limited to, the user logic, the one or more user logic constraints and so on. Also, the implementation system 201 may transmit data to the implementation system 204, for the implementation, via the I/O interface 206. The transmitted data may include, but is not limited to, at least one of the one or more local mapping optimization parameters, the one or more local placement optimization parameters, the one or more timing parameters, the timing performance, the bit stream and so on. The I/O interface 206 may be coupled with the processor 205 of the implementation system 201.

Figure 3:
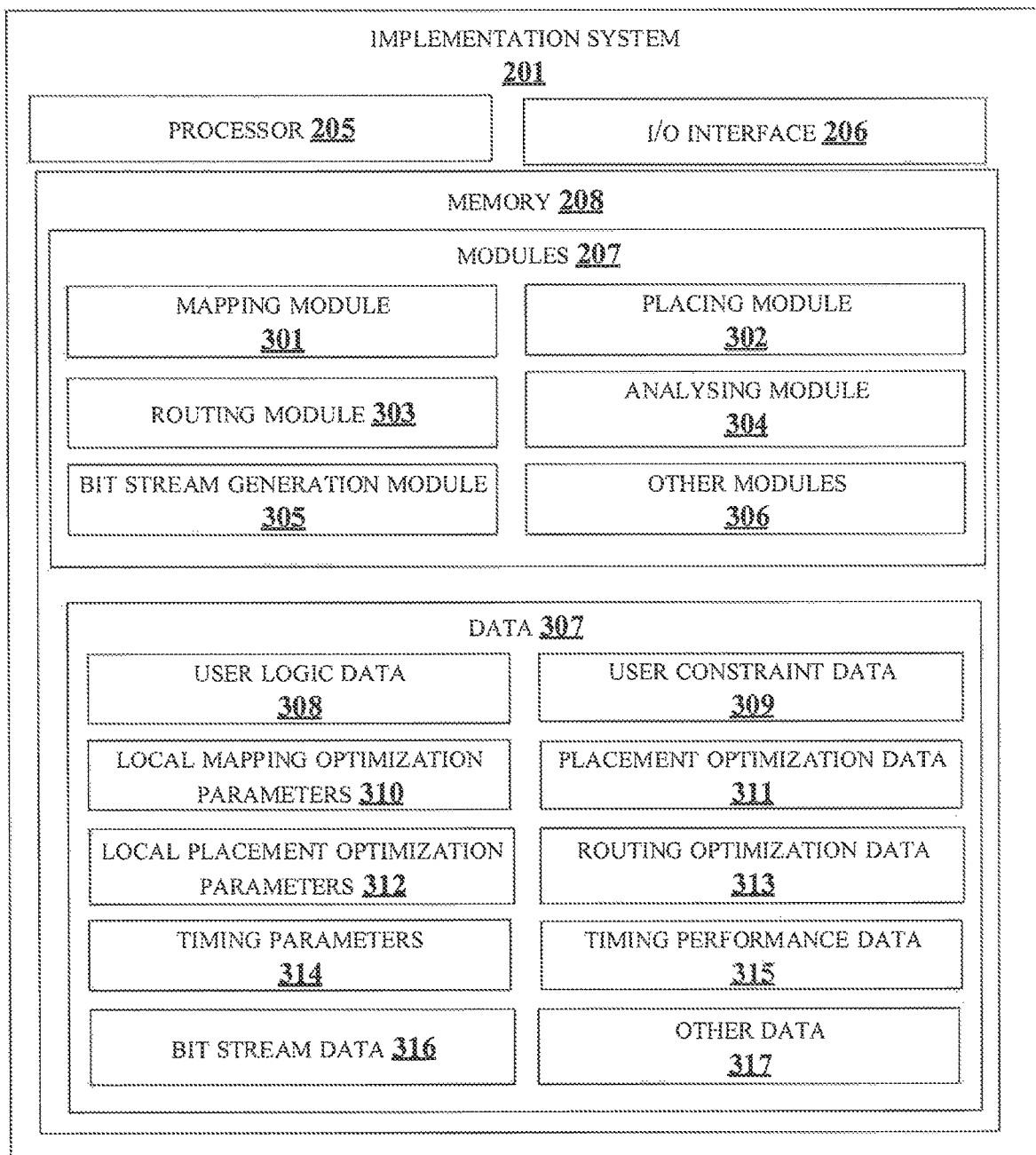
FIG. 3 shows a detailed block diagram of an implementation system for implementation of user logic in a FPGA device, in accordance with some embodiments of the present disclosure.

FIG. 3 shows a detailed block diagram of an implementation system 201 for implementation of user logic in a FPGA device.

Data 307 and the one or more modules 207 in the memory 208 of the implementation system 201 may be described herein in detail.

In one implementation, the one or more modules 207 may include, but are not limited to, a mapping module 301, a placing module 302, a routing module 303, an analysing module 304, bit stream generation module 305 and one or more other modules 306, associated with the implementation system 201.

In an embodiment, the data 307 in the memory 208 may comprise user logic data 308 (also referred to as user logic 308), user logic constraint data 309 (also referred to as one or more user logic constraints 309), local mapping optimization parameters 310 (also referred to as one or more local mapping optimization parameters 310), placement optimization data 311, local placement optimization parameters 312 (also referred to as one or more local placement optimization parameters 312), routing optimization data 313, timing parameters 314 (also referred to as one or more timing parameters 314), timing performance data 315 (also referred to as timing performance 315), bit stream data 316 (also referred to as bit stream 316) and other data 317 associated with the implementation system 201.

In an embodiment, the data 307 in the memory 208 may be processed by the one or more modules 207 of the implementation system 201. In an embodiment, the one or more modules 207 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

Further, in reference to FIG. 3, the mapping module 301 may be configured to perform the mapping of the user logic 308 onto the one or more cells of the FPGA device in the implementation platform. One or more techniques, known to a person skilled in the art, may be implemented for the mapping.

Upon mapping, the placing module 302 may be configured to perform placing of the one or more mapped cells of the FPGA device in the implementation platform 204. In the present disclosure, the placing may be based on the one or more local mapping optimization parameters 310. The one or more local mapping optimization parameters 310 may include, but are not limited to, at least one of the cell-type parameter and the cell-mapping parameter.

Figure 4:
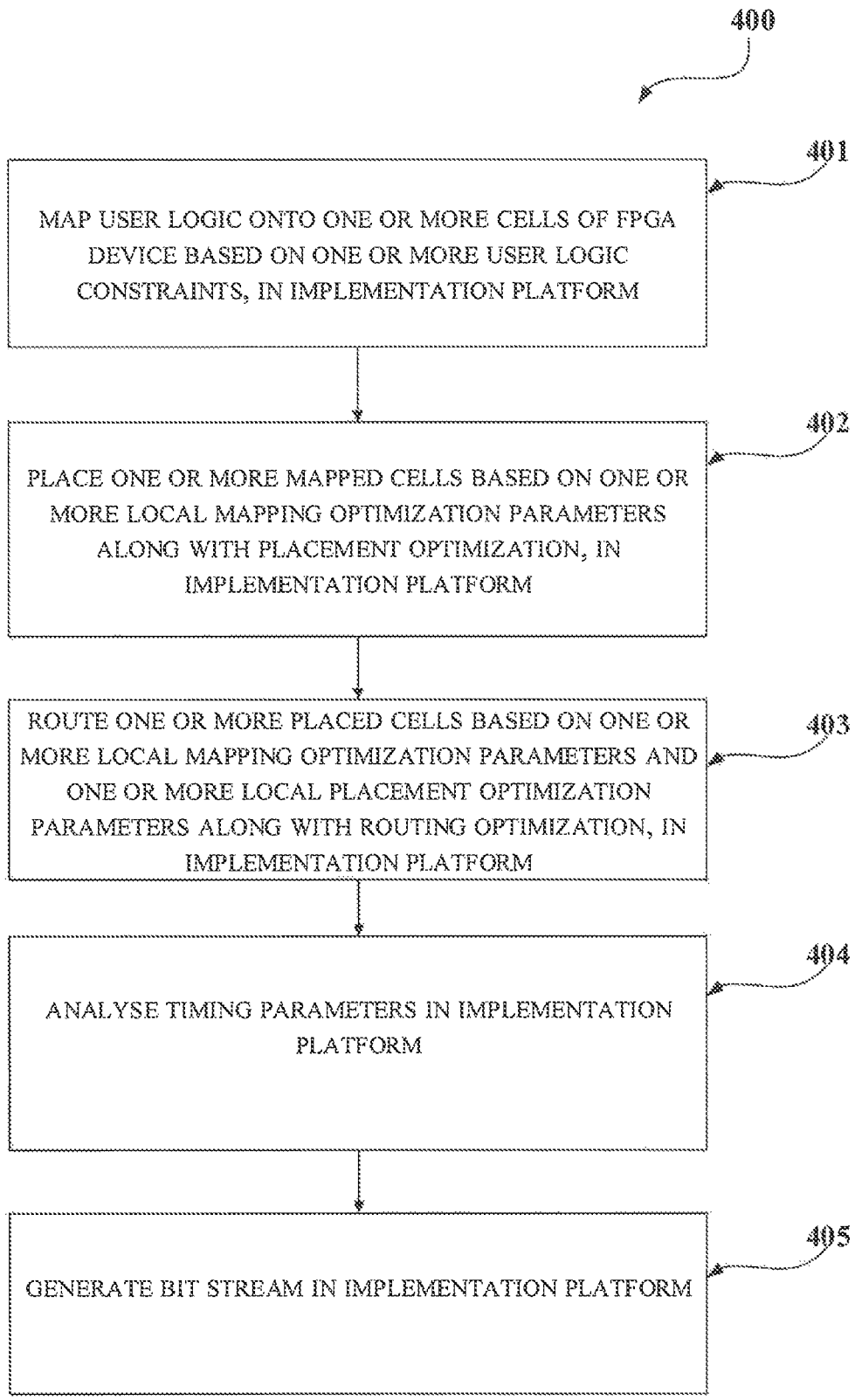
FIG. 4 illustrates a flowchart showing an exemplary method for implementation of user logic in a FPGA device, in accordance with some embodiments of present disclosure.

FIG. 4 illustrates a flowchart showing an exemplary method for implementation of the user logic 308 in the FPGA device, in accordance with some embodiments of present disclosure At block 401, the mapping module 301 may be configured to map the user logic 308 onto the one or more cells of the FPGA device based on the one or more user logic constraints 309, in the implementation platform 204. The one or more user logic constraints 309 may be received from the user 203.

At block 402 the placing module 302 may be configured to place the one or more mapped cells of the FPGA device in the implementation platform 204. The placing may be based on the one or more local mapping optimization parameters 310. Along with the placement, the placing module 302 may be configured to perform the placement optimization.

At block 403, the routing module 303 may be configured to route the one or more placed cells of the FPGA device in the implementation platform 204. The routing may be based on the one or more local mapping optimization parameters 310 and the one or more local placement optimization parameters 312. Along with the routing, the routing module 303 may be configured to perform the routing optimization.

At block 404, the analysing module 304 may be configured to analyse the one or more timing parameters 314 associated with the one or more cells, upon the placing and the routing. The analysis may be performing to determine the timing performance 315 of the user logic 308 is met based on the one or more user logic constraints 309.

At block 405, the bit stream generation module 305 may be configured to generate the bit stream 316, upon determining the timing performance 315 of the user logic 308 is met based on the one or more user logic constraints 309. The bit stream 316 may be generated based on the placing and the routing.

As illustrated in FIG. 4, the method 400 may include one or more blocks for executing processes in the implementation system 201. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

FIGS. 5a-5d illustrate exemplary embodiments for placing of the one or more cells based on the cell-mapping parameter as the one or more local mapping optimization parameters 310. FIGS. 5a-5d have been explained in conjunction with the elements of FIGS. 1-3.

Figure 5A:
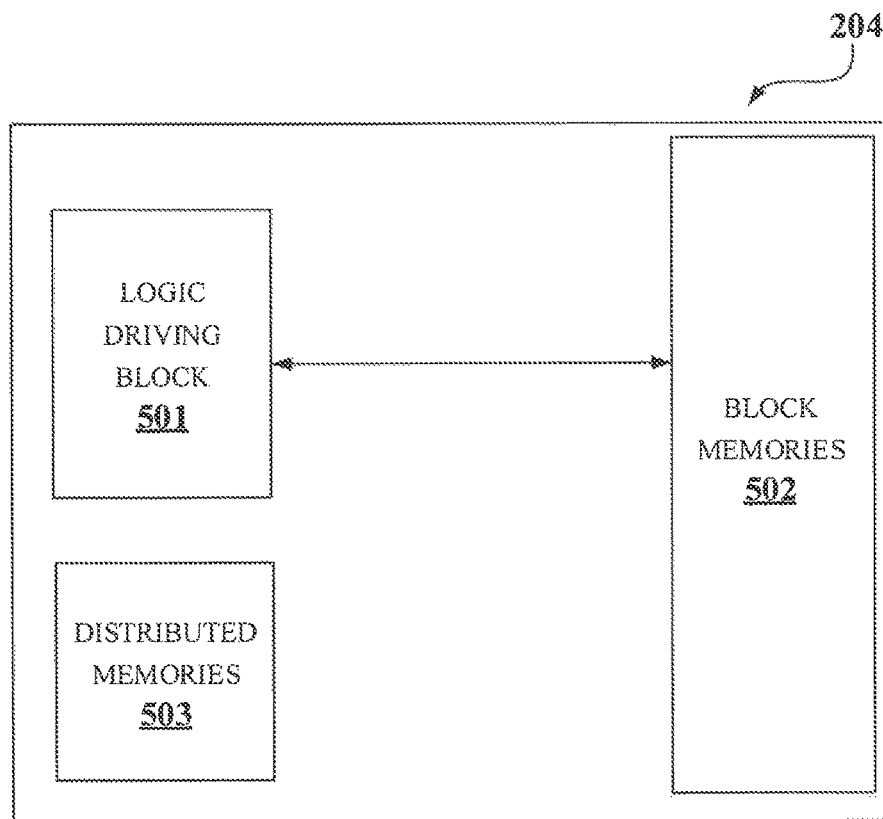
FIGS. 5a-5d and 6a-6d illustrate exemplary embodiments for placing of one or more cells based on cell-mapping parameter as one or more local mapping optimization parameters, in accordance with some embodiments of present disclosure.
Figure 5B:
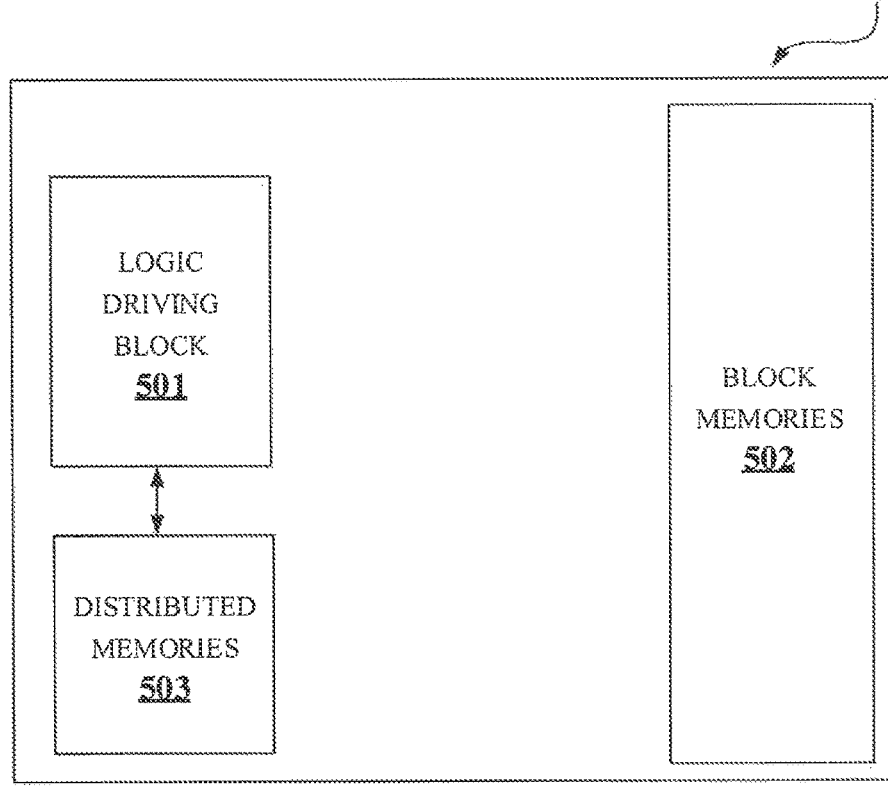
Figure 5C:
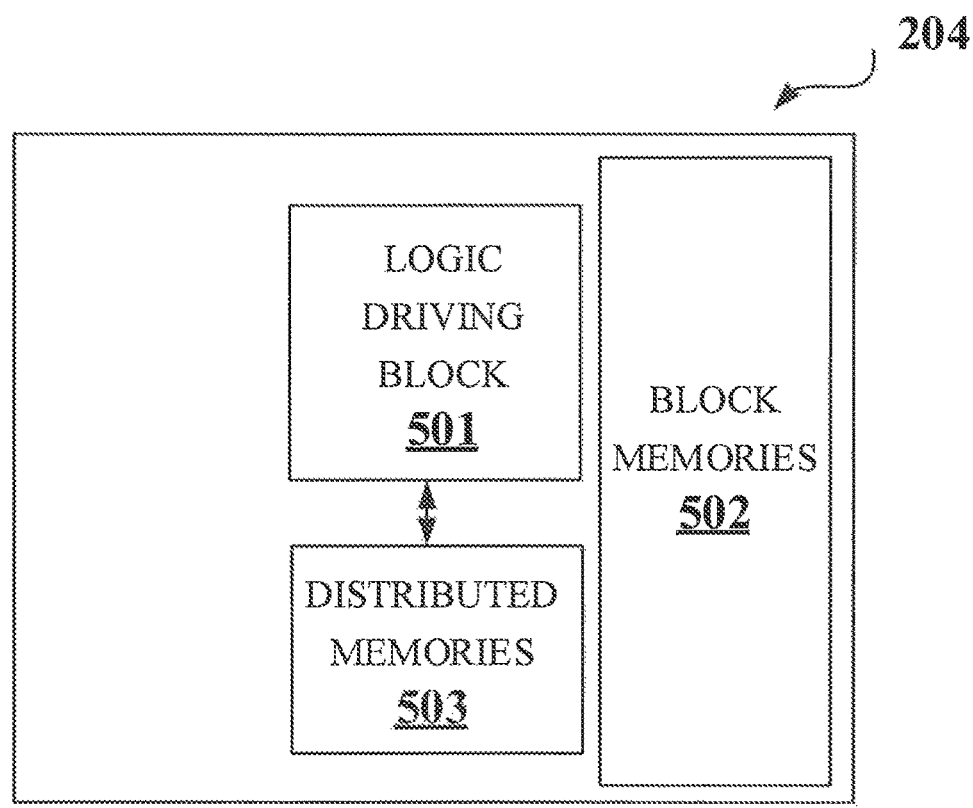
Figure 5D:
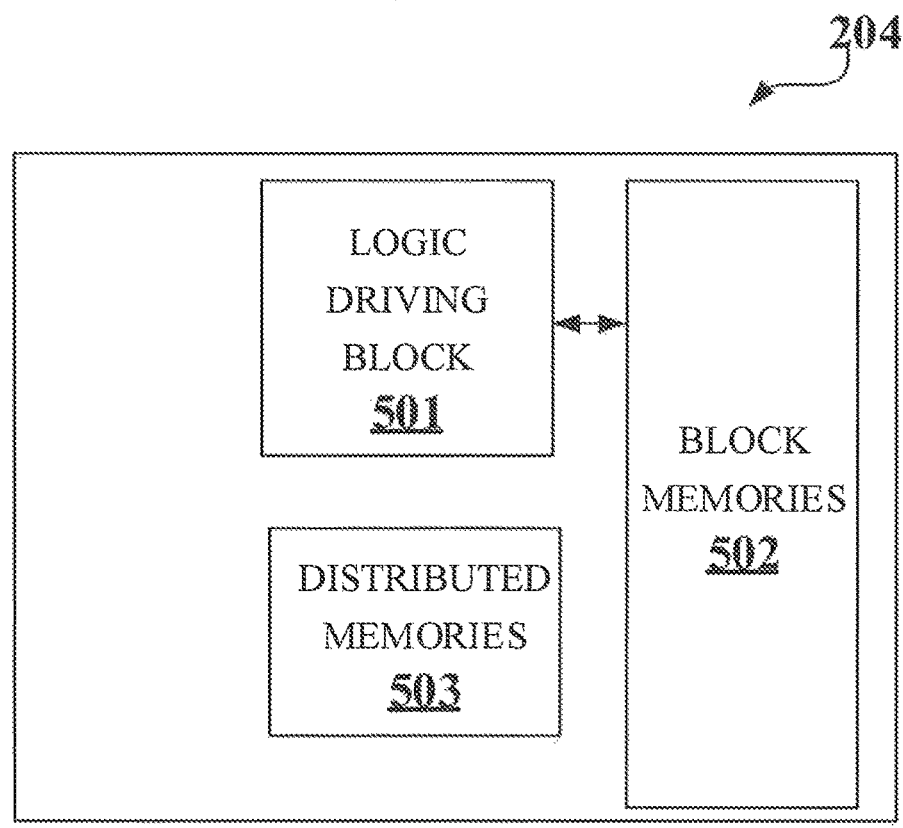

The one or more cells of the FPGA device may be associated with memories, which may include block memories or distributed memories. It may be known to a skilled in art that the block memories are at fixed location in the FPGA device. Consider a user logic 308 comprising a logic driving block 501, block memories 502 and distributed memories 503. Smaller memories may be required by the logic driving blocks for driving the user logic 308 and the logic driving block 501 may be located at far proximity with the block memories 502. During the mapping, the logic driving block 501 may be mapped with the block memories 502 as shown in FIG. 5a, for driving the user logic 308. In the present disclosure, by performing the placing based on the cell-mapping parameter as the one or more local mapping optimization parameters 310, the logic driving block 501 may be remapped with the distributed memories 503 as shown in FIG. 5b. By this, further routing of the logic driving block 501 and the distributed memories 503 may be eased and also route length for the routing may be reduced. Similarly, consider, the logic driving block 501 may be located at close proximity with the block memories 502. During the mapping, the logic driving block 501 may be mapped with the distributed memories 503 in the implementation platform 204, as shown in FIG. 5c, for driving the user logic 308. In the present disclosure, by performing the placing based on the cell-mapping parameter as the one or more local mapping optimization parameters 310, the logic driving block 501 may be remapped with the block memories 502 in the implementation platform 204, as shown in FIG. 5d. By this, further routing of the logic driving block 501 and the block memories 502 may be eased and also route length for the routing may be reduced. Also, area occupied by the distributed memories 503 may be more than that of the block memories 502 because the distributed memories 503 may consume space for LUTs. Hence, area associated with implementation of the user logic may be reduced using the block memories 502.

FIG. 6a-6d illustrate another exemplary embodiment illustrating the placing of the one or more cells based on the cell-mapping parameter as the one or more local mapping optimization parameters 310. FIGS. 6a-6d have been explained in conjunction with the elements of FIGS. 1-3.

Figure 6A:
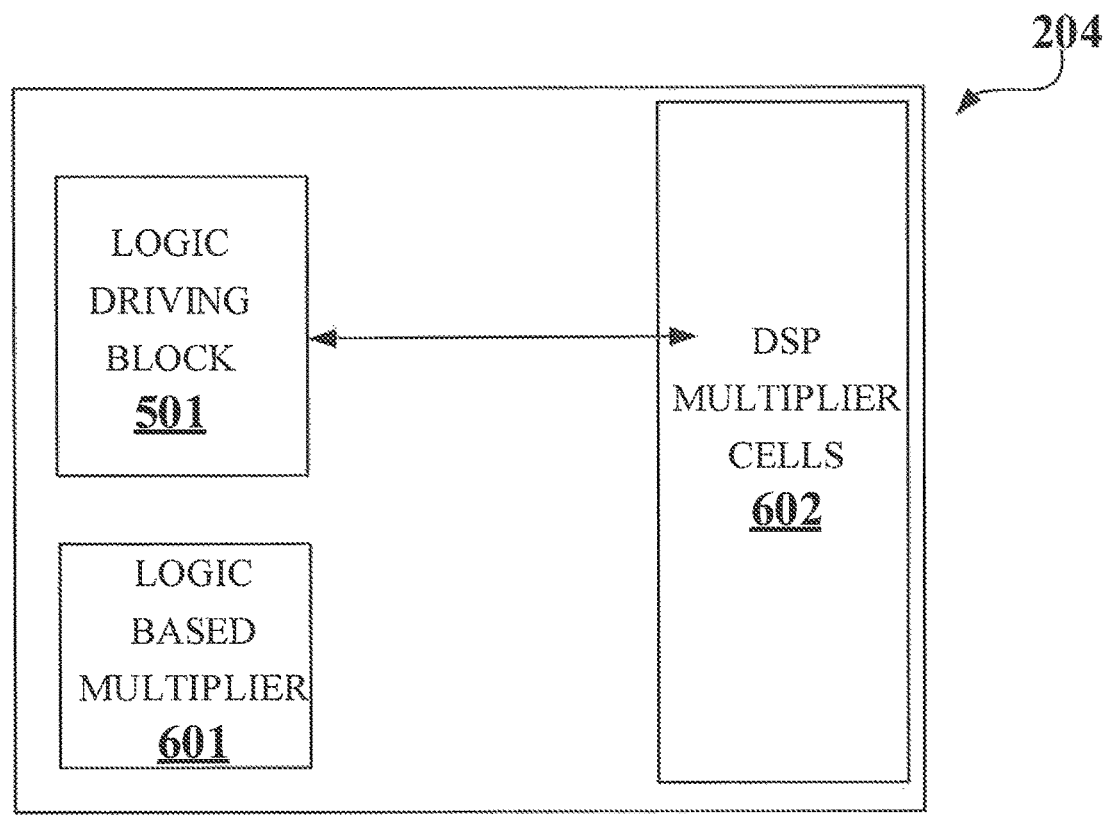
Figure 6B:
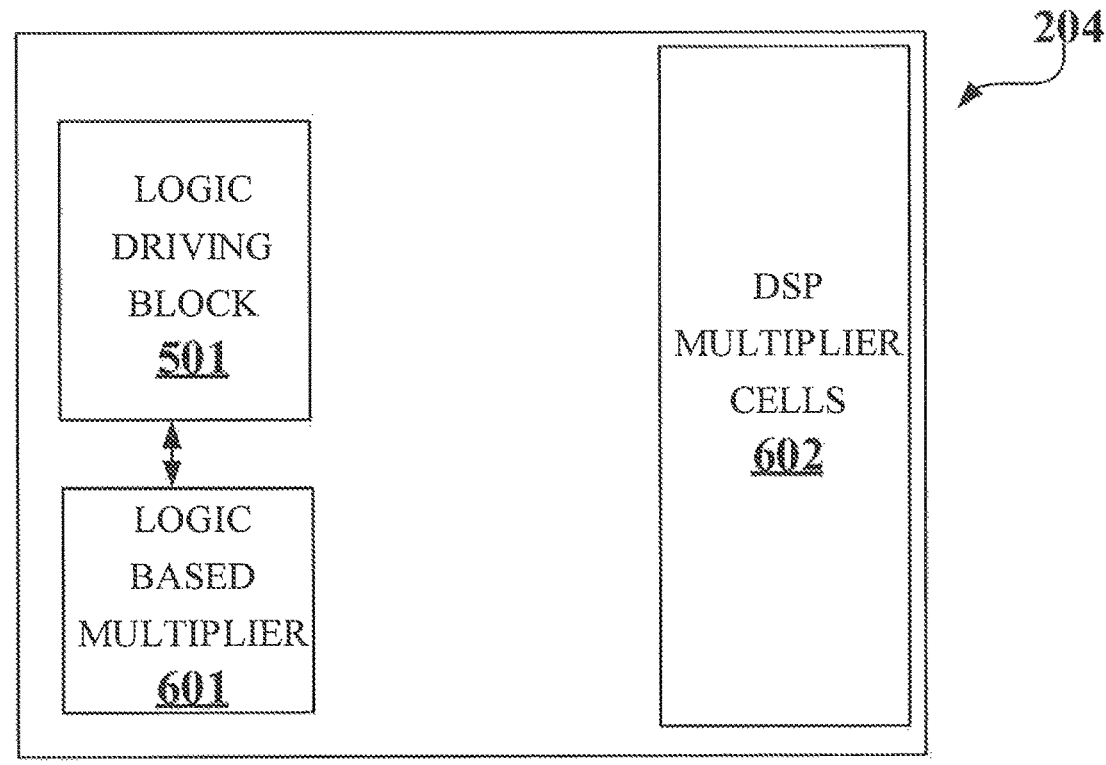
Figure 6C:
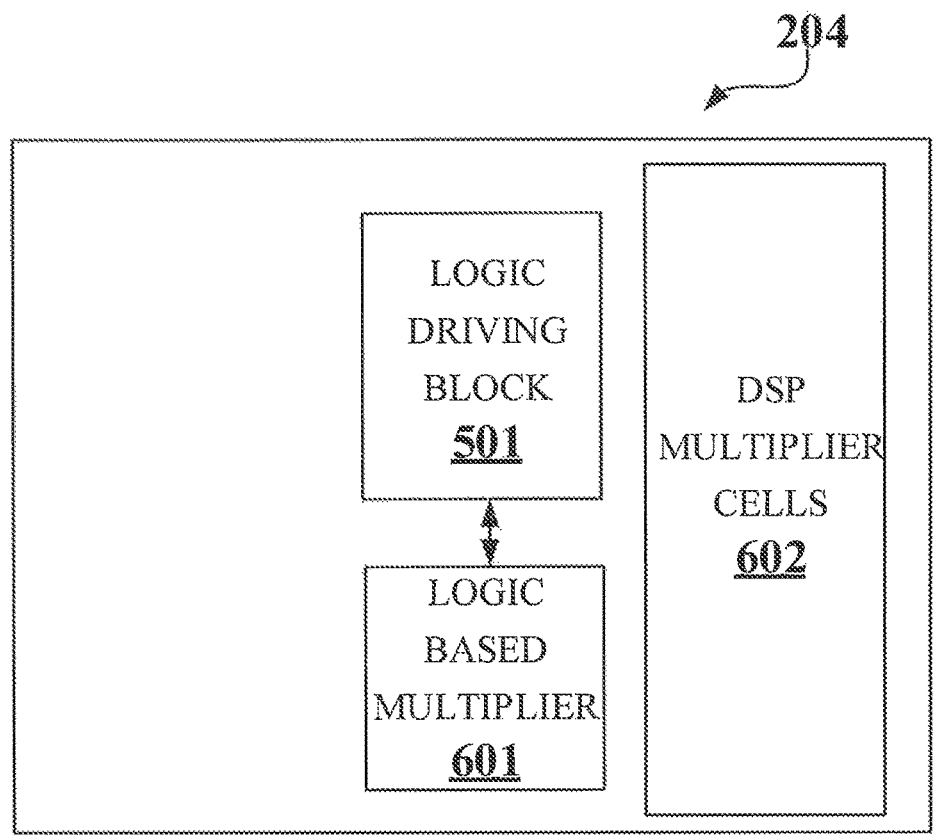
Figure 6D:
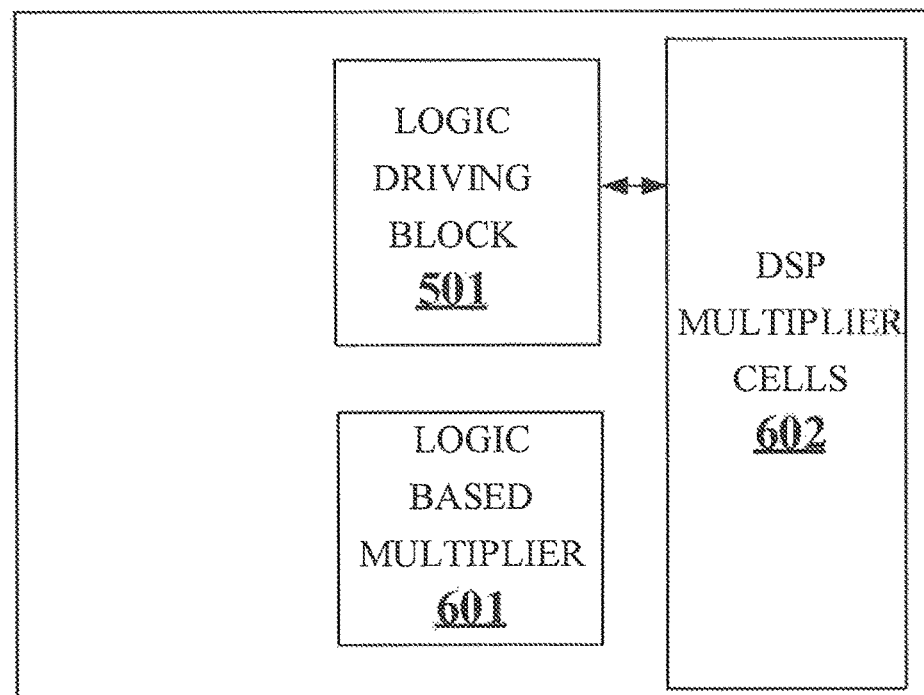

The one or more cells of the FPGA device may be associated with multipliers which may include Digital Signal Processor (DSP) multiplier cells or logic based multiplier. It may be known to a skilled in the art that, like the block memories, the DSP multiplier cells 602 are at fixed location in the FPGA device. Consider a user logic 308 comprising the logic driving block 501, the DSP multiplier cells 602 and the logic based multiplier 601. Smaller multipliers may be required by the logic driving blocks for driving the user logic 308 and the logic driving block 501 may be located at far proximity with the DSP multiplier cells 602. During the mapping, the logic driving block 501 may be mapped with the DSP multiplier cells 602 in the implementation platform 204, as shown in FIG. 6a, for driving the user logic 308. In the present disclosure, by performing the placing based on the cell-mapping parameter as the one or more local mapping optimization parameters 310, the logic driving block 501 may be remapped with the logic based multiplier 601 in the implementation platform 204, as shown in FIG. 6b. Similarly, consider, the logic driving block 501 may be located at close proximity with the DSP multiplier cells 602. During the mapping, the logic driving block 501 may be mapped with the logic based multiplier 601 in the implementation platform 204 as shown in FIG. 6c, for driving the user logic 308. In the present disclosure, by performing the placing based on the cell-mapping parameter as the one or more local mapping optimization parameters 310, the logic driving block 501 may be remapped with the DSP multiplier cells 602 in the implementation platform 204, as shown in FIG. 6d.

Figure 7A:
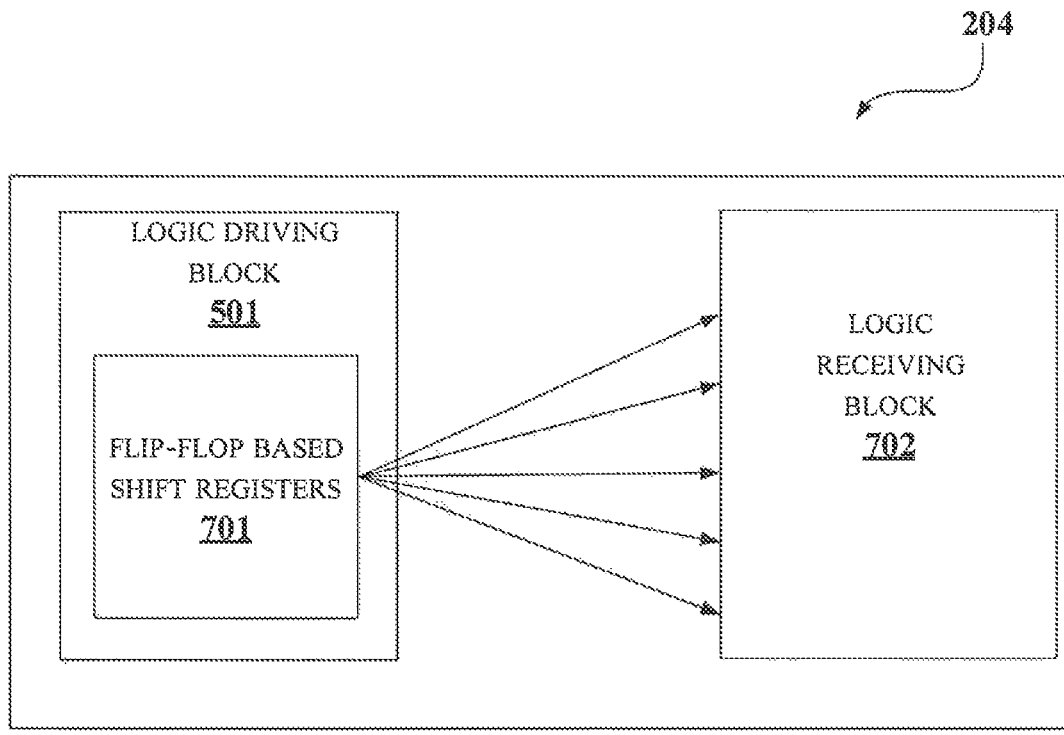
FIGS. 7a-7b illustrate exemplary embodiments for placing of one or more cells based on cell-type parameter as one or more local mapping optimization parameters, in accordance with some embodiments of present disclosure.
Figure 7B:
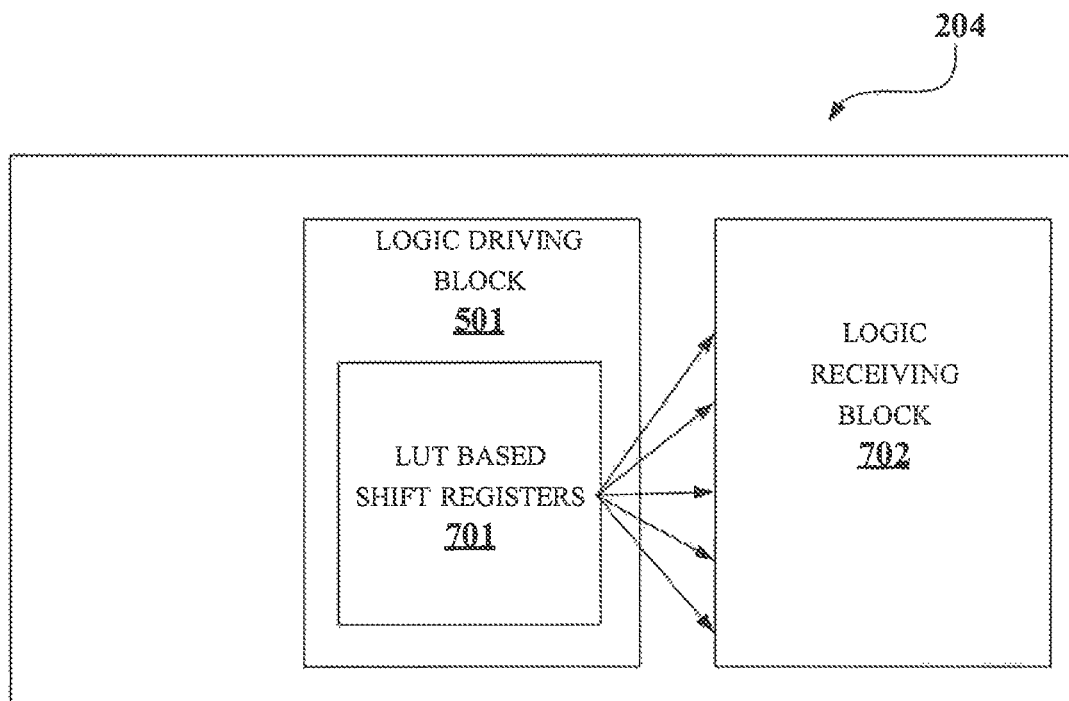

FIG. 7a-7b illustrate exemplary embodiments illustrating the placing of the one or more cells based on the cell-type parameter as the one or more local mapping optimization parameters 310. FIGS. 7a-7b have been explained in conjunction with the elements of FIGS. 1-3.

Consider a user logic 308 comprising the logic driving block 501, logic receiving block 702 and flip-flop based shift registers 701 or LUT based shift registers 703 associated with logic driving block 501. Shift registers, for implementing the user logic, may be may be of two types, namely, the flip-flop based shift registers 701 and the LUT based shift registers 703. Cell-type of the shift registers may be changed during the placing, based on the cell-type parameter from the one or more local mapping optimization parameters 310. Consider, during the mapping, the LUT based shift registers 703 or the flip-flop based shift registers 701 may be mapped with the logic receiving block 702. During the placing, based on the proximity of the logic driving block 501 and the logic receiving block 702, and based on fan-out attribute associated with the user logic 308, the placing module 302 may change the cell type of the shift registers from the LUT based shift registers 703 to the flip-flop based shift registers 701 and vice versa, in the implementation platform 204. The placing in the implementation platform 204, as shown in FIG. 7a, may be performed when the logic driving block 501 is of far proximity with the logic receiving block 702 and when value of the fan-out attribute is high. The placing in the implementation platform 204, as shown in FIG. 7b, may be performed when the logic driving block 501 is of close proximity with the logic receiving block 702 and also when value of the fan-out attribute is low.

In an embodiment, the placing module 302 may also be configured to perform the placement optimization during the placing based on the one or more local mapping optimization parameters 310. In an embodiment, the placement optimization may include, but is not limited to, at least one of the fan-out optimization process, the re-routing process, the register replication process, and the re-timing process, performed during the placing. One or more data associated with the placement optimization may be stored as the placement optimization data 311 in the memory 208 of the implementation platform.

Upon the placing, the routing module 303 may route the one or more placed cells of the FPGA device in the implementation platform 204. In an embodiment, the routing may be based on the one or more local mapping optimization parameters 310 and the one or more local placement optimization parameters 312. As described previously, changes and modifications based on the cell-type parameter and the cell-mapping parameter may also be performed during routing. Further, the one or more local placement optimization parameters 312 may include, but are not limited to, at least one of the cell movement parameter, the cell packing density parameter and the interconnect utilization density parameter.

Figure 8A:
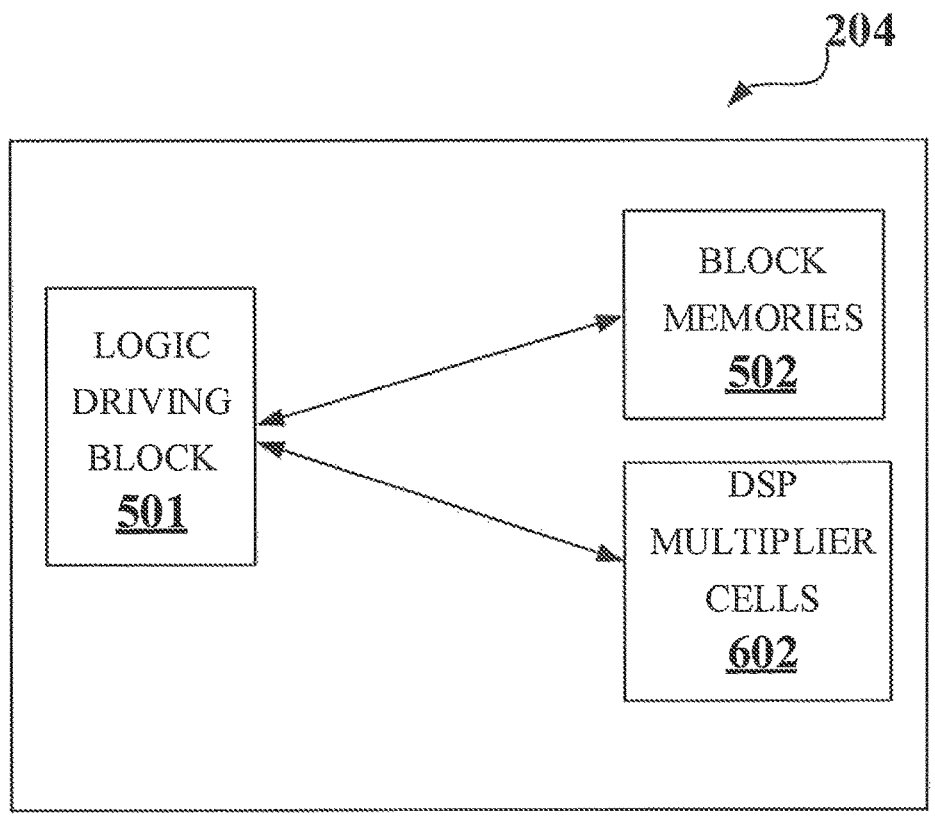
FIGS. 8a-8b illustrate exemplary embodiments for routing of one or more cells based on cell movement parameter as one or more local placement optimization parameters, in accordance with some embodiments of present disclosure.
Figure 8B:
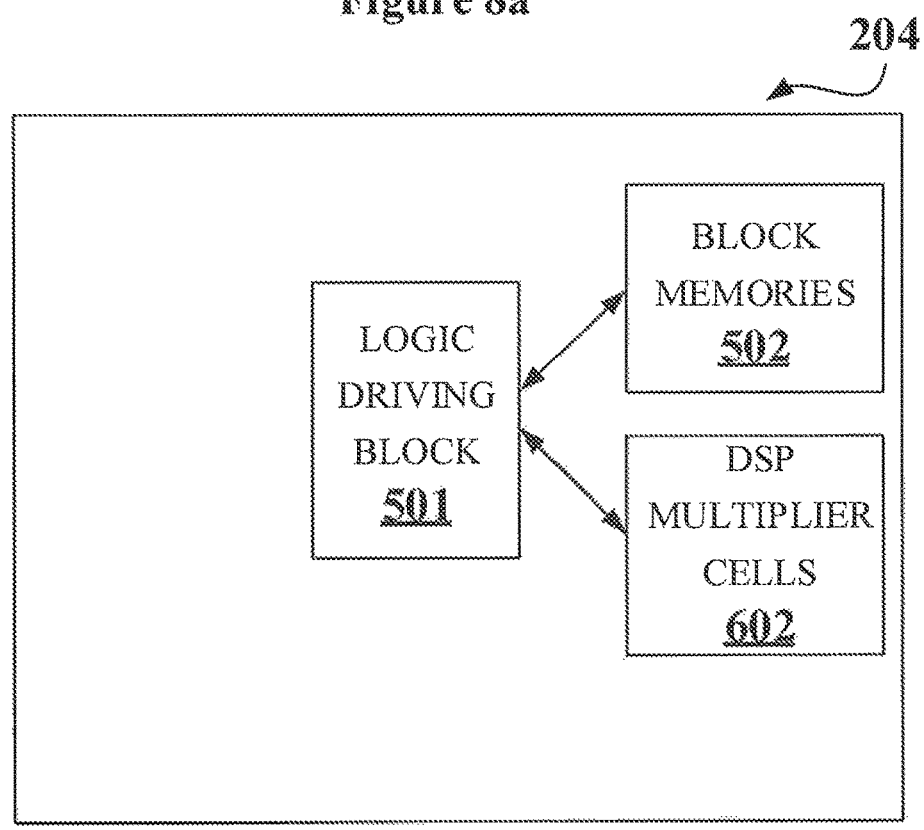

FIGS. 8a-8b illustrate exemplary embodiments illustrating routing of the one or more cells based on the cell movement parameter as the one or more local placement optimization parameters 312. FIGS. 8a-8b have been explained in conjunction with the elements of FIGS. 1-3.

Consider, a user logic 308 comprising the logic driving block 501, the block memories 502 and the DSP multiplier cells 602. By the placing, the logic driving block 501 may be placed relatively farther from the DSP multiplier cells 602 compared to the placement of block memories 502 from the DSP multiplier cells 602, in the implementation platform 204, as shown in FIG. 8a. By performing routing based on the cell movement parameter as the one or more local placement optimization parameters 312, the logic driving block 501 may be moved to a closer proximity of the block memories 502 and the DSP multiplier cells 602 in the implementation platform 204, as shown in FIG. 8b. By this, route lengths associated with routing of the logic driving block 501 with the block memories 502 and the DSP multiplier cells 602 may be reduced.

Figure 9A:
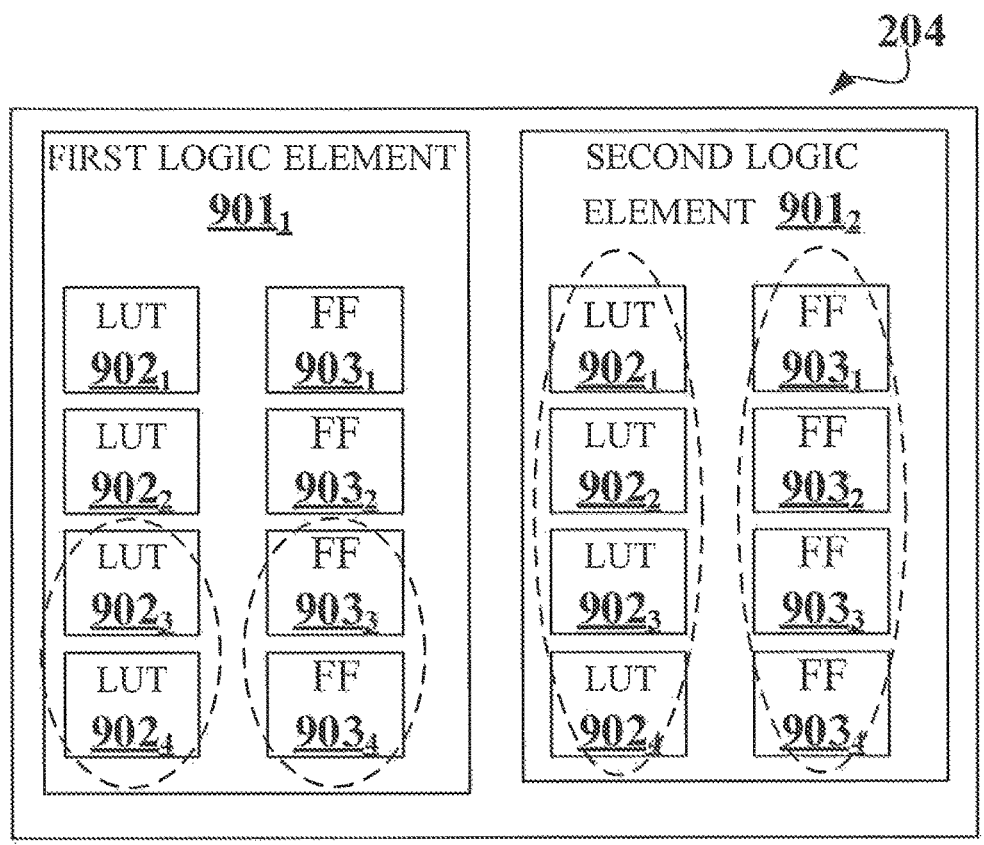
FIGS. 9a-9b illustrate exemplary embodiments for routing of one or more cells based on cell packing density parameter as one or more local placement optimization parameters, in accordance with some embodiments of present disclosure.
Figure 9B:
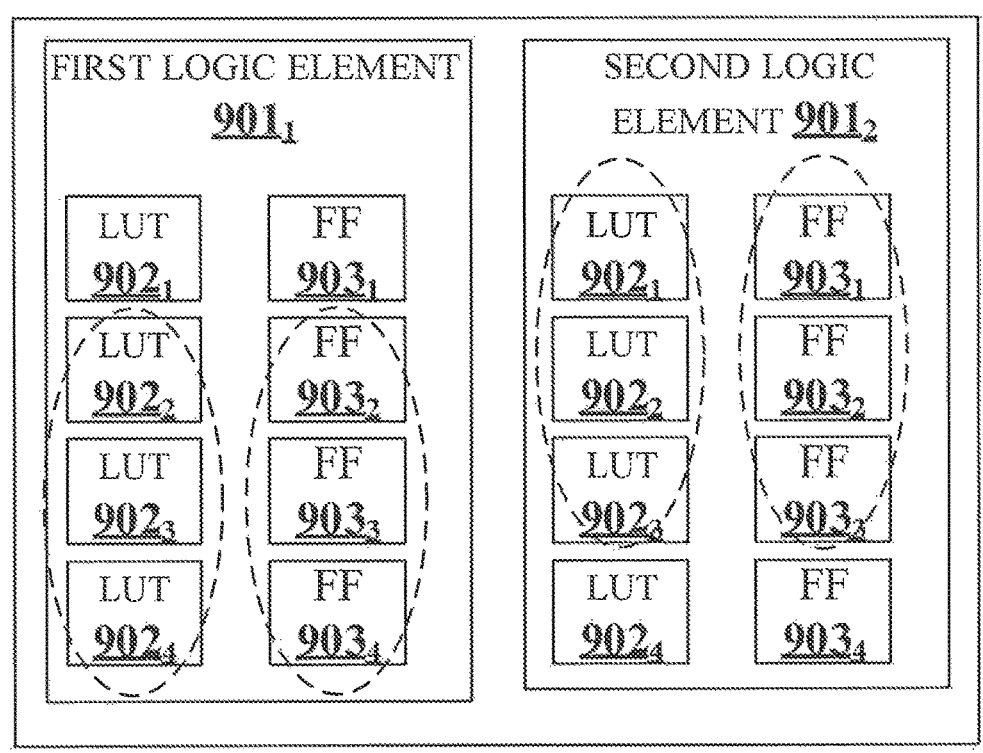

FIGS. 9a-9b illustrate exemplary embodiments illustrating the routing of the one or more cells based on the cell packing density parameter as the one or more local placement optimization parameters 312. FIGS. 9a-9b have been explained in conjunction with the elements of FIGS. 1-3.

Consider, a user logic 308 comprising a first logic element $901_1$ and a second logic element $901_2$. It may be known to a person skilled in the art that a logic element may comprise one or more LUTs and one or more FFs. In given example, the first logic element may comprise LUTs $902_1 \ldots 902_4$ and FFs $903_1 \ldots 903_4$. By the mapping and the placing, packing density associated with the LUTs and FFs may be decided. As shown in FIG. 9a, the packing density of the LUTs $902_1 \ldots 902_4$ and FFs $903_1 \ldots 903_4$ for the first logic element may be decided to be '0.5' and the packing density of the LUTs $902_1 \ldots 902_4$ and FFs $903_1 \ldots 903_4$ for the first logic element may be decided to be '1'. By performing routing based on the cell packing density parameter as the one or more local placement optimization parameters 312, the packing density for the first logic element and the second logic element may be modified to '0.75' in the implementation platform, as shown in FIG. 9b. By this, cell density associated with the user logic 308 may be reduced and, the routing congestion may be reduced. Reduction in the routing congestion improves overall timing performance 315 of the user logic 308.

Figure 10A:
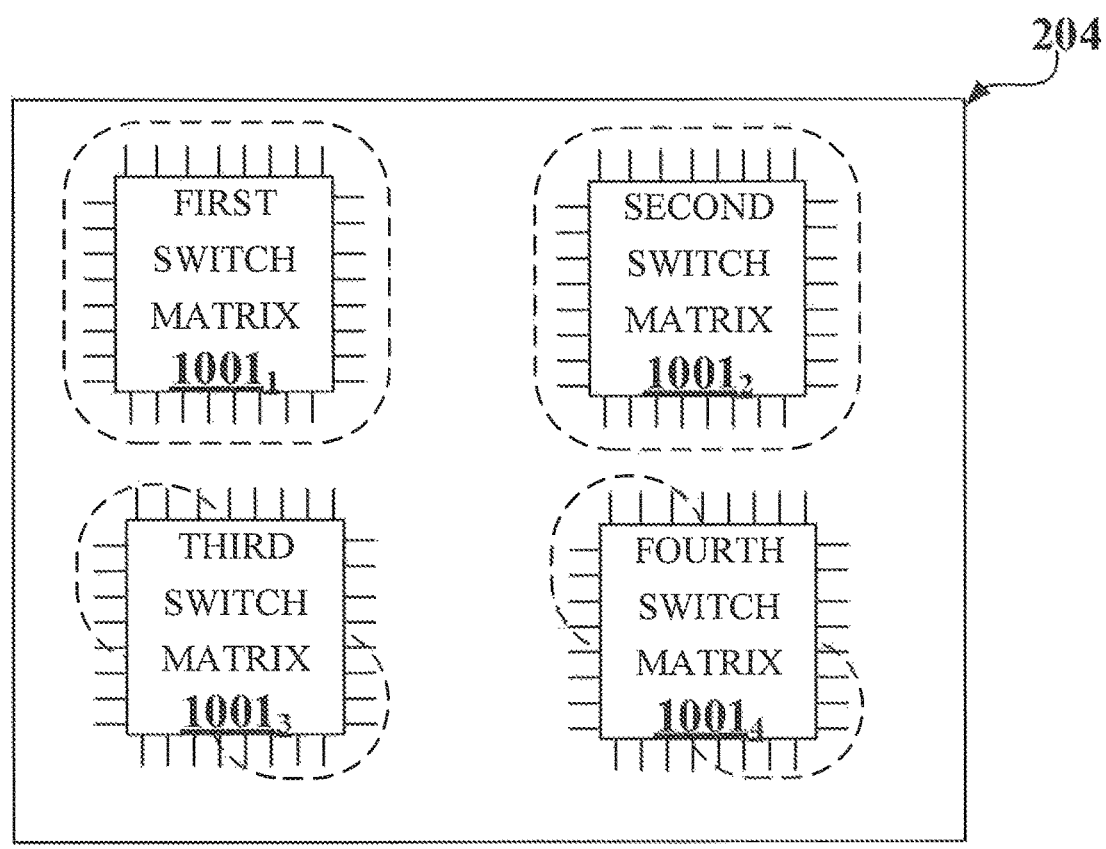
FIGS. 10a-10b illustrate exemplary embodiments for routing of one or more cells based on interconnect utilization density parameter as one or more local placement optimization parameters, in accordance with some embodiments of present disclosure.
Figure 10B:
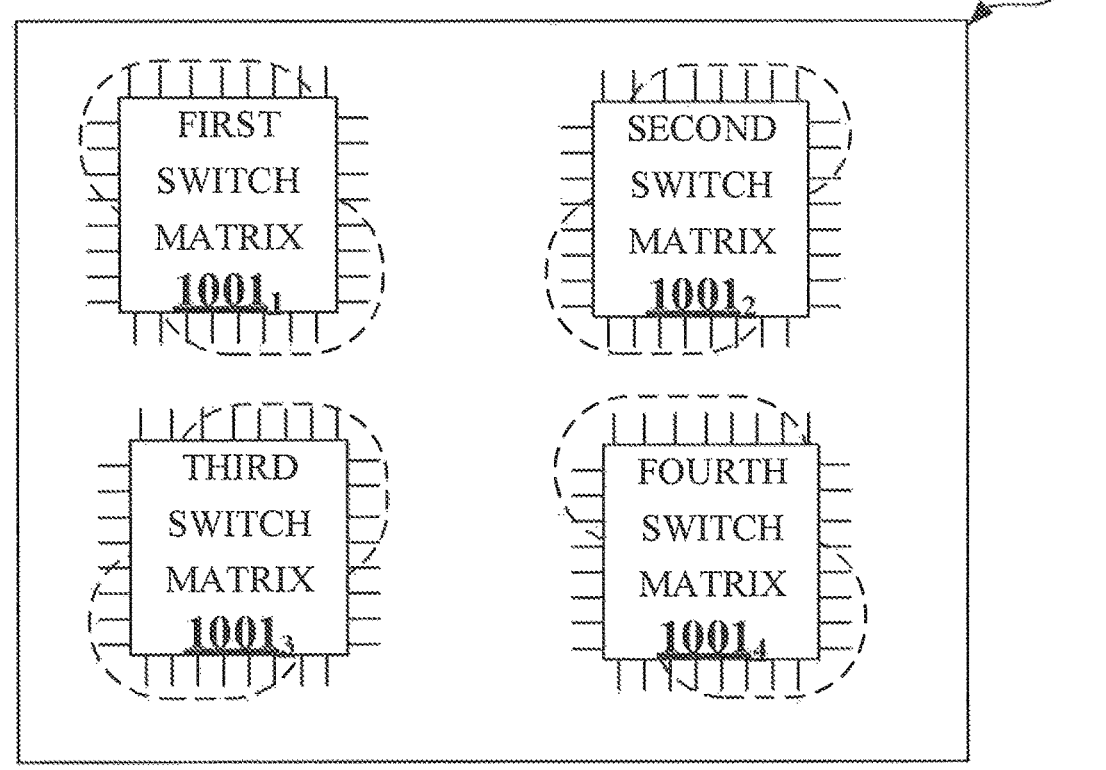

FIGS. 10a-10b illustrate exemplary embodiments illustrating the routing of the one or more cells based on the interconnect utilization density parameter as the one or more local placement optimization parameters 312. FIGS. 10a-10b have been explained in conjunction with the elements of FIGS. 1-3.

Consider, a user logic 308 comprising four routing switch matrices $1001_1 \ldots 1001_4$. It may be known to a person skilled in the art that as routing switch matrix comprises plurality of I/O ports, which may be used for routing the one or more cells. Based on the usage of the I/O ports in the routing switch matrix, interconnect utilization density may be determined. By the mapping and the placing, the interconnect utilization density associated with first routing switch matrix $1001_1$ and second routing switch matrix $1001_2$ may be determined to be '1' and the interconnect utilization density associated with third routing switch matrix $1001_3$ and fourth routing switch matrix $1001_4$ may be determined to be '0.5' in the implementation platform 204, as shown in FIG. 10a. By performing routing based on the interconnect utilization density parameter as the one or more local placement optimization parameters 312, the interconnect utilization density for all the switch matrices $1001_1 \ldots 1001_4$ may be modified to be '0.75'. By which the routing congestion may be reduced to improve the timing performance 315.

In an embodiment, the routing module 303 may also be configured to perform the routing optimization during the routing based on the one or more local mapping optimization parameters 310 and the one or more local placement optimization parameters 312. In an embodiment, the routing optimization may include, but is not limited to, at least one of the fan-out optimization process, the re-routing process, the register replication process, and the re-timing process, performed during the routing. One or more data associated with the routing optimization may be stored as the routing optimization data 313 in the memory 208 of the implementation system 201.

The analysing module 304 may be configured to the analysis of one or more timing parameters 314 associated 314 with the FPGA device in the implementation platform 204. One or more techniques, known to a person skilled in the art may be implemented for the analysis.

The bit stream generation module 305 may be configured to generate the bit stream 316 for the FPGA device in the implementation platform 204 based on the placing, the routing, and the timing performance 315. One or more techniques, known to a person skilled in the art may be implemented for the generation.

The other data 317 may store data, including temporary data and temporary files, generated by modules for performing the various functions of the implementation system 201. The one or more modules 207 may also include other modules 306 to perform various miscellaneous functionalities of the implementation system 201. It will be appreciated that such modules may be represented as a single module or a combination of different modules.

Computing System

Figure 11:
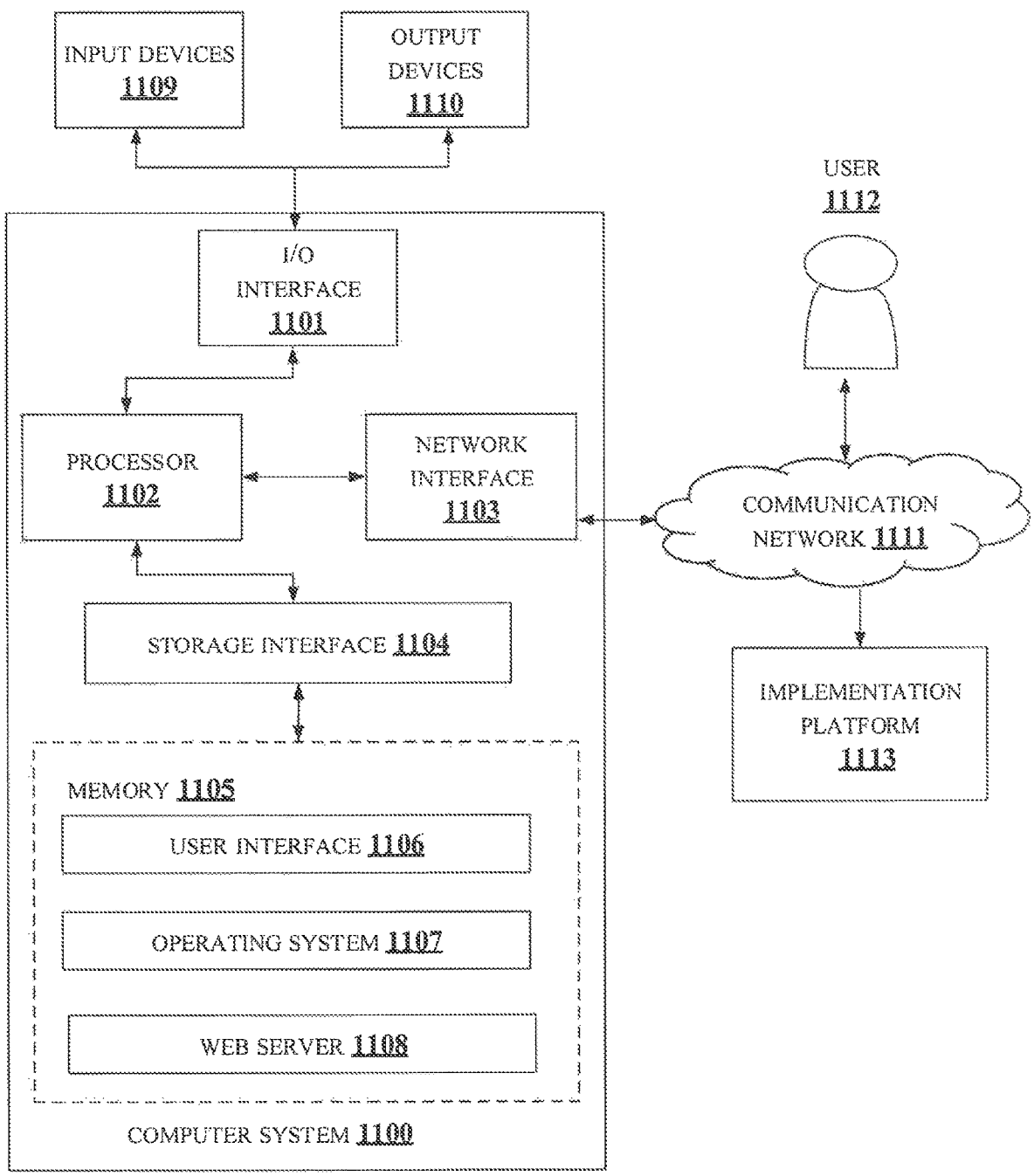
FIG. 11 illustrates a block diagram of an exemplary computer system for implementing embodiments consistent with the present disclosure.

FIG. 11 illustrates a block diagram of an exemplary computer system 1100 for implementing embodiments consistent with the present disclosure. In an embodiment, the computer system 1100 is used to implement the implementation system 201. The computer system 1100 may include a central processing unit ("CPU" or "processor") 1102. The processor 1102 may include at least one data processor for executing processes in Virtual Storage Area Network. The processor 1102 may include specialized processing units such as, integrated system (bus) controllers, memory management control units, floating point units, graphics processing units, digital signal processing units, etc.

The processor 1102 may be disposed in communication with one or more input/output (I/O) devices 1109 and 1110 via I/O interface 1101. The I/O interface 1101 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1101, the computer system 1100 may communicate with one or more I/O devices 1109 and 1110. For example, the input devices 1109 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 1110 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 1100 may consist of the implementation system 201. The processor 1102 may be disposed in communication with the communication network 1111 via a network interface 1103. The network interface 1103 may communicate with the communication network 1111. The network interface 1103 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1111 may include, without limitation, a direct interconnection, local area network (LAN), wide area network (WAN), wireless network (e.g., using Wireless Application Protocol), the Internet, etc. Using the network interface 1103 and the communication network 1111, the computer system 1100 may communicate with a user 1112 and an implementation platform 1113 for implementation of user logic in a FPGA device. The network interface 1103 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 1111 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 1102 may be disposed in communication with a memory 1105 (e.g., RAM, ROM, etc. not shown in FIG. 11) via a storage interface 1104. The storage interface 1104 may connect to memory 1105 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 1105 may store a collection of program or database components, including, without limitation, user interface 1106, an operating system 1107 etc. In some embodiments, computer system 1100 may store user/application data 1106, such as, the data, variables, records, etc., as described in this disclosure. Such databases may be implemented as fault-tolerant, relational, scalable, secure databases such as Oracle® or Sybase®.

The operating system 1107 may facilitate resource management and operation of the computer system 1100.

Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions to perform local optimization during implementation of a user logic for the FPGA, by which, minor changes associated with each of the one or more cells may be performed.

An embodiment of the present disclosure helps to reduce area utilization, routing congestion, routing length to improve the timing performance of logic to be implemented on the FPGA device.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 200 | Environment |
| 201 | Implementation system |
| 202 | Communication network |
| 203 | User |
| 204 | Implementation platform |
| 205 | Processor |
| 206 | I/O interface |
| 207 | Modules |
| 208 | Memory |
| 301 | Mapping module |
| 302 | Placing module |
| 303 | Routing module |
| 304 | Analysing module |
| 305 | Bit stream generation module |
| 306 | Other modules |
| 307 | Data |
| 308 | User logic data |
| 309 | User logic constraint data |
| 310 | Local mapping optimization parameters |
| 311 | Placement optimization data |
| 312 | Local placement optimization parameters |
| 313 | Routing optimization data |
| 314 | Timing parameters |
| 315 | Timing performance data |
| 316 | Bit stream data |
| 317 | Other data |
| 501 | Logic driving block |
| 502 | Block memories |
| 503 | Distributed memories |
| 601 | Logic based multiplier |
| 602 | DSP multiplier cells |
| 701 | Flip-flop based shift registers |
| 702 | Logic receiving block |
| 703 | LUT based shift registers |
| $901_1$ and $901_2$ | Logic elements |
| $902_1 \ldots 902_4$ | Look-up tables |
| $903_1 \ldots 903_4$ | Flip-flops |
| $1001_1 \ldots 1001_4$ | Routing switch matrices |
| 1100 | Computer System |
| 1101 | I/O Interface |
| 1102 | Processor |
| 1103 | Network Interface |
| 1104 | Storage Interface |
| 1105 | Memory |
| 1106 | User Interface |
| 1107 | Operating System |
| 1108 | Web Server |
| 1109 | Input Devices |
| 1110 | Output Devices |
| 1111 | Communication Network |
| 1112 | User |
| 1113 | Implementation platform |

I claim:

1. A method for implementation of user logic in a Field Programmable Gate Array (FPGA) device, the method comprising:
    mapping, by an implementation system, a user logic onto one or more cells of the FPGA device, in an implementation platform associated with the FPGA device, based on one or more user logic constraints to be met and received for the FPGA device;
    placing, by the implementation system, the one or more mapped cells of the FPGA device to form one or more placed cells, in the implementation platform, based on one or more local mapping optimization parameters, wherein the placing also comprises performing a placement optimization on the one or more placed cells of the FPGA device; and
    routing, by the implementation system, the one or more placed cells of the FPGA device to form one or more routed cells, in the implementation platform, based on at least the one or more local mapping optimization parameters and one or more local placement optimization parameters, wherein the routing also comprises performing a routing optimization on the one or more routed cells of the FPGA device.

2. The method as claimed in claim 1 further comprising:
    analyzing, by the implementation system, one or more timing parameters associated with the FPGA device in the implementation platform, to determine a timing performance of routed user logic in the FPGA device has met the one or more user logic constraints; and
    generating, by the implementation system, a bit stream for the FPGA device in the implementation platform based on the placing, the routing, and the timing performance.

3. The method as claimed in claim 1, wherein each of the placement optimization and the routing optimization comprises at least one of: a corresponding fan-out optimization process, a corresponding re-routing process, a corresponding register replication process, and a corresponding re-timing process.

4. The method as claimed in claim 1, wherein the one or more local mapping optimization parameters comprises at least one of a cell-type parameter and a cell-mapping parameter.

5. The method as claimed in claim 4, wherein the cell-type parameter is associated with a local change in cell type of one or more cells and the cell-mapping parameter is associated with a local change in cell mapping of the one or more cells.

6. The method as claimed in claim 1, wherein the one or more local placement optimization parameters comprises at least one of a cell movement parameter, a cell packing density parameter and a interconnect utilization density parameter.

7. The method as claimed in claim 6, wherein the cell movement parameter is associated with a local movement of placement of one or more cells based on proximity of the one or more cells.

8. The method as claimed in claim 6, wherein the cell packing density parameter is associated with a local packing of one or more cells based on routability among the one or more cells.

9. The method as claimed in claim 6, wherein the interconnect utilization density parameter is associated with a local interconnection utilization of one or more cells based on a routing congestion.

10. An implementation system for implementation of user logic in a Field Programmable Gate Array (FPGA) device, the implementation system comprises:
    a processor; and
    a memory communicatively coupled to the processor, wherein the memory stores processor-executable instructions, which, on execution, cause the processor to:
        map a user logic onto one or more cells of the FPGA device, in an implementation platform associated with the FPGA device, based on one or more user logic constraints to be met and received for the FPGA device;
        place the one or more mapped cells of the FPGA device to form one or more placed cells, in the implementation platform, based on one or more local mapping optimization parameters, wherein the placing also comprises of performing a placement optimization on the one or more placed cells of the FPGA device; and route the one or more placed cells of the FPGA device to form one or more routed cells, in the implementation platform, based on at least the one or more local mapping optimization parameters and one or more local placement optimization parameters, wherein the routing also comprises of performing a routing optimization on the one or more routed cells of the FPGA device.

11. The implementation system as claimed in claim 10, the processor further configured to:

analyze one or more timing parameters associated with the FPGA device in the implementation platform, to determine a timing performance of routed user logic in the FPGA device has met the one or more user logic constraints; and generate a bit stream for the FPGA device in the implementation platform based on the placing, the routing, and the timing performance.

12. The implementation system as claimed in claim 10, wherein each of the placement optimization and the routing optimization comprises at least one of: a corresponding fan-out optimization process, a corresponding re-routing process, a corresponding register replication process, and a corresponding re-timing process.

13. The implementation system as claimed in claim 10, wherein the one or more local mapping optimization parameters comprises at least one of a cell-type parameter and a cell-mapping parameter.

14. The implementation system as claimed in claim 13, wherein the cell-type parameter is associated with a local change in cell type of one or more cells and the cell-mapping parameter is associated with a local change in cell mapping of the one or more cells.

15. The implementation system as claimed in claim 10, wherein the one or more local placement optimization parameters comprises at least one of a cell movement parameter, a cell packing density parameter and a interconnect utilization density parameter.

16. The implementation system as claimed in claim 15, wherein the cell movement parameter is associated with a local movement of placement of one or more cells based on proximity of the one or more cells.

17. The implementation system as claimed in claim 15, wherein the cell packing density parameter is associated with a local packing of one or more cells based on routability among the one or more cells.

18. The implementation system as claimed in claim 15, wherein the interconnect utilization density parameter is associated with a local interconnection utilization of one or more cells based on a routing congestion.

19. A non-transitory computer readable medium including instructions stored thereon for implementation of user logic in a Field Programmable Gate Array (FPGA) device, the instructions which, when executed by at least one processor, cause a device to perform operations comprising:

mapping a user logic onto one or more cells of the FPGA device to form one or more placed cells, in an implementation platform associated with the FPGA device, based on one or more user logic constraints to be met and received for the FPGA device;

placing the one or more mapped cells of the FPGA device to form one or more routed cells, in the implementation platform, based on one or more local mapping optimization parameters, wherein the placing also comprises of performing a placement optimization on the one or more placed cells of the FPGA device; and routing the one or more placed cells of the FPGA device, in the implementation platform, based on at least the one or more local mapping optimization parameters and one or more local placement optimization parameters, wherein the routing also comprises of performing a routing optimization on the one or more routed cells of the FPGA device.

20. The medium as claimed in claim 19 further comprising:

analyzing one or more timing parameters associated with the FPGA device in the implementation platform, to determine a timing performance of routed user logic in the FPGA device has met the one or more user logic constraints; and generating a bit stream for the FPGA device in the implementation platform based on the placing, the routing, and the timing performance.

* * * * *